(12) United States Patent
Kiely

(10) Patent No.: US 7,164,086 B1
(45) Date of Patent: Jan. 16, 2007

(54) ELECTRICAL CONNECTOR

(75) Inventor: Kenneth M. Kiely, Milford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 0 days.

(21) Appl. No.: 11/441,377

(22) Filed: May 25, 2006

(51) Int. Cl.
*H02G 3/18* (2006.01)

(52) U.S. Cl. .................. 174/653; 174/665; 174/151; 248/56

(58) Field of Classification Search .............. 248/49, 248/62, 63, 74.4, 56; D8/396, 395, 394; 285/424; 174/68.1, 68.3, 153 R, 84 R, 665, 174/656, 21 R, 88 R, 657, 64, 72 A, 152 G, 174/153 G, 480, 481, 151, 135, 167, 650, 174/659, 663, 653; 16/2.1, 2.2; 439/142, 439/557, 567, 553, 552, 357, 358
See application file for complete search history.

(56) References Cited

U.S. PATENT DOCUMENTS

| | | | | |
|---|---|---|---|---|
| 2,967,722 A | * | 1/1961 | Lifka | .................. 285/424 |
| 4,775,122 A | * | 10/1988 | McClymont | ................ 174/665 |
| 5,872,335 A | * | 2/1999 | Mullen, Jr. | ................. 174/653 |
| D473,783 S | * | 4/2003 | Kiely | ........................... D8/396 |
| D479,984 S | * | 9/2003 | Kiely | ........................... D8/396 |
| 6,737,584 B1 | * | 5/2004 | Kiely | ......................... 174/656 |
| 6,875,918 B1 | * | 4/2005 | Sudo et al. | ............... 174/72 A |
| 6,881,901 B1 | * | 4/2005 | Egan | ......................... 174/665 |

\* cited by examiner

*Primary Examiner*—Angel R. Estrada
(74) *Attorney, Agent, or Firm*—Melvin I. Stoltz

(57) ABSTRACT

By providing a cover member which is pivotally mounted to the base member and is constructed for being automatically securely affixed to the base member by frictional and locking engagement therewith, an efficient, easily manufactured and easily assembled conduit/cable connector is realized. In addition, the cover member comprises a pair of gripping fingers constructed for engaging and holding a flexible metal conduit and/or armored or metal clad cable. As a result of this construction, the operator is able to quickly and easily insert a flexible metal conduit and/or armored or metal clad cable into the gripping fingers of the cover member, and then arcuately pivot the cover member and the engaged metal conduit and/or armored or metal clad cable into the precisely desired mounted position with the base member.

20 Claims, 3 Drawing Sheets

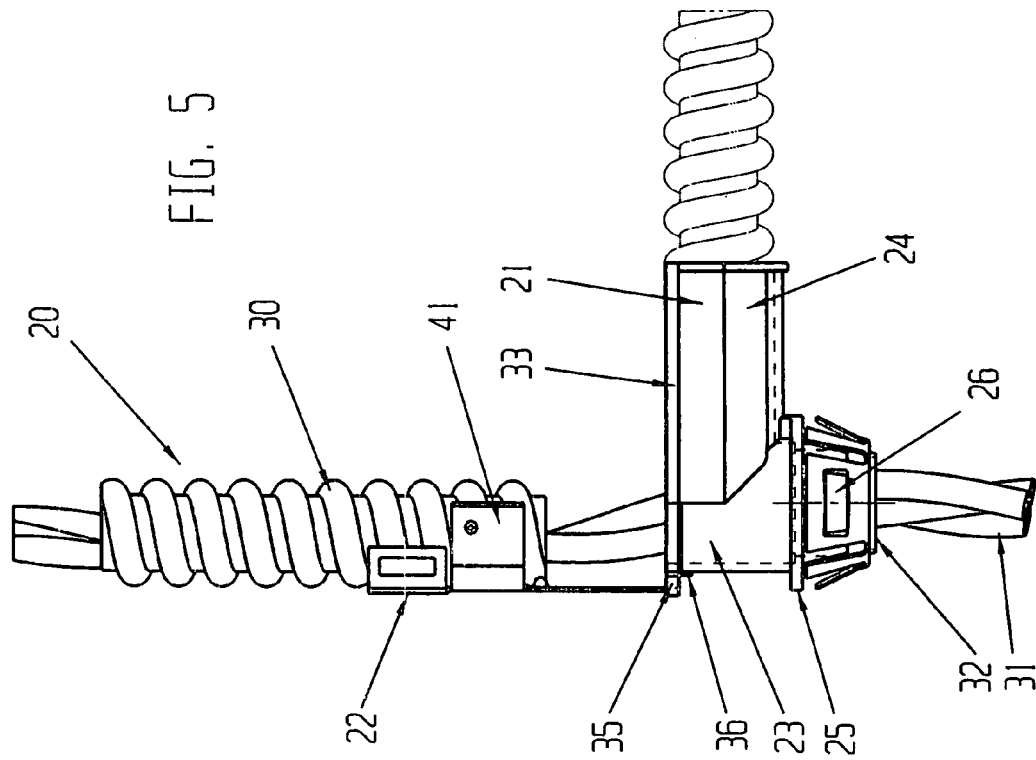
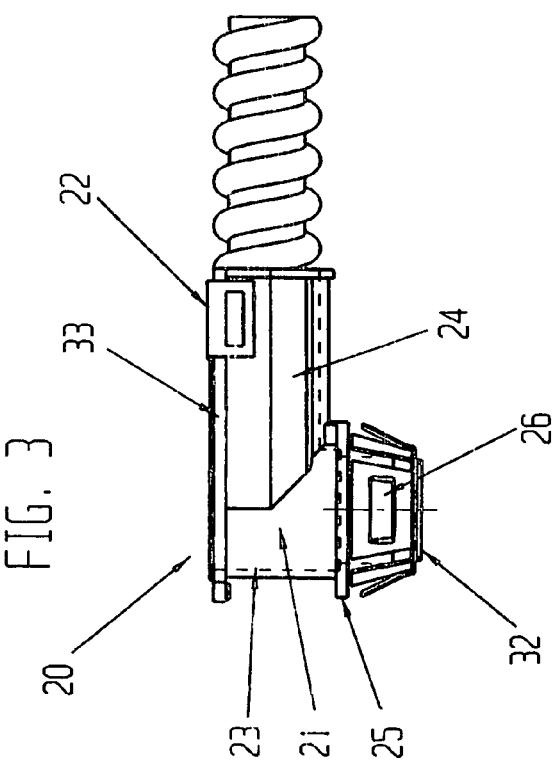
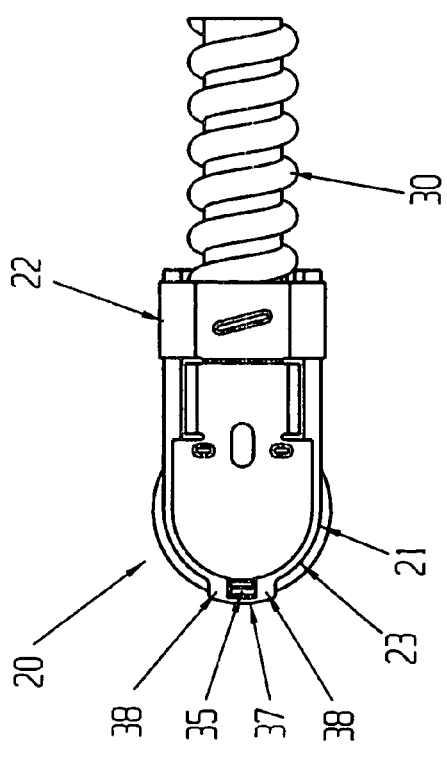

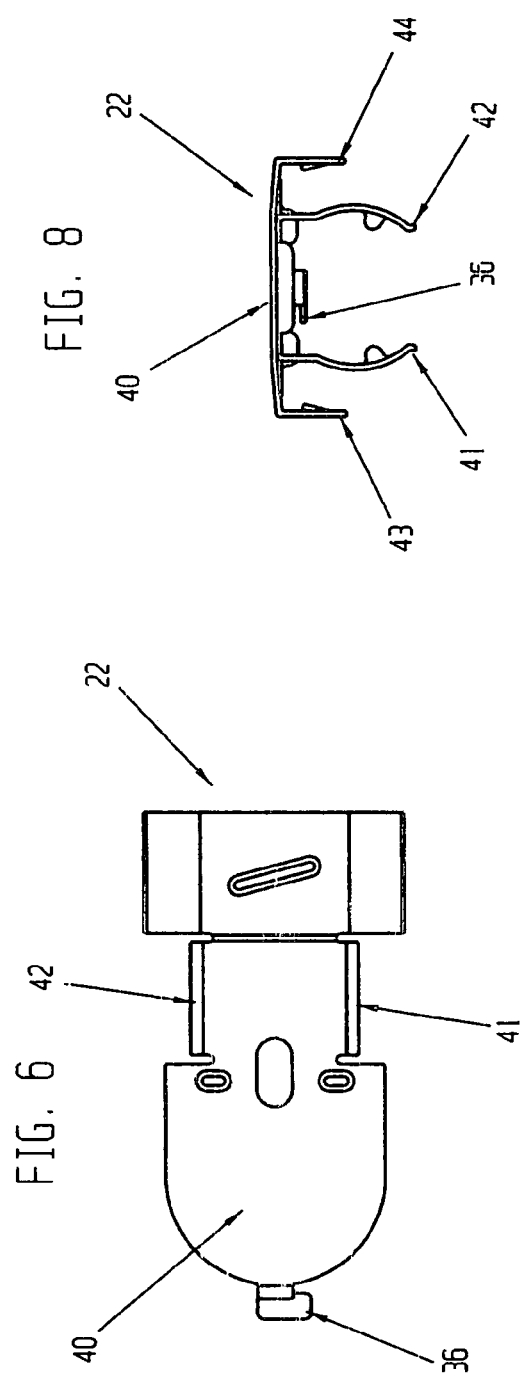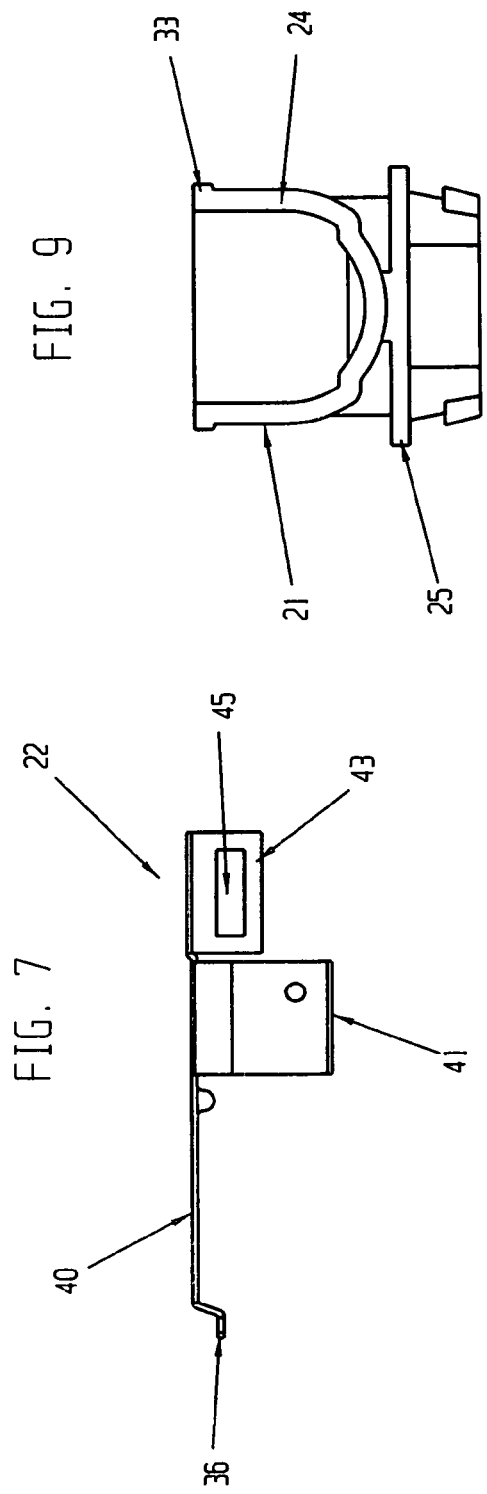

ELECTRICAL CONNECTOR

TECHNICAL FIELD

This invention relates to electrical connectors, and more particularly, to electrical connectors constructed for securing flexible metal conduits and/or metal clad sheath cables to junction boxes and/or outlet boxes.

BACKGROUND ART

In the field of wiring homes and buildings, whether for new construction or for improvements or expansion, substantial development and product improvements have been made. Typically, these improvements are directed to enabling installers to securely mount any desired wiring to any desired location in the most efficient and quickest manner.

In any particular installation or location, various conduits or cables must be interconnected to each other as well as connected to the primary power supply in a suitable power distributing outlet box, junction box or other enclosure. In each of these instances, flexible metal conduits and/or armored or metal clad cables, within which the electrical power carrying wires are contained, must be securely mounted to the housing of the junction box or outlet box, or connected to appropriate devices, in a protected area.

In order to enable installers to securely mount flexible metal conduits and/or armored or metal clad cables to any desired junction box or outlet box, numerous prior art connectors have been developed. However, in spite of the substantial effort that has been expended in developing such connectors, these prior art systems have drawbacks or difficulties which prevent their universal adoption and use.

In general, the industry has long sought to have a single conduit/cable connector which is quickly and easily secured to any desired junction box or outlet box which enables flexible metal conduits and/or metal clad or armored cables to be securely mounted to the connector with a bend which substantially comprises a right angle. Due to the location or position of the junction box and/or outlet box, flexible metal conduits and/or metal clad or armored cables frequently require right angle bends in order to obtain the optimum securement location for affixing the cable to the outlet box and/or junction box.

Although various prior art constructions have been developed for enabling flexible meal conduits and/or metal clad or armored cables to be mounted to outlet boxes and/or junction boxes with a right angle bend incorporated therewith, these prior art constructions have proven to be extremely difficult to employ due to the configuration and mounting requirements incorporated into these prior art connectors. In general, the prior art connectors incorporate two components, a base member which incorporates a right angular construction, and a cover member which is securable to the base member. Although these constructions function to enable the conduits and/or metal clad or armored cables to be secured in the desired manner, these prior art constructions suffer in their complexity of use.

Most prior art connectors require the user to employ both hands to remove the cover, and then require the user to use both hands to secure the cover in the desired position. Since the installer must also hold the conduit and/or metal clad or armored cable in the desired position for affixation to the connector, use of the connector is extremely difficult and cumbersome. As a result, substantial difficulty is encountered and additional manpower is frequently required.

Therefore, it is a principal object of the present invention to provide a connector for use with flexible metal conduits and/or armored or metal clad cables which provides secure, rapid mounted engagement and retention of the conduit and/or cable and connector for mounting of the conduit/cable at right angles with any desired outlet box and/or a junction box.

Another object of the present invention is to provide a connector for use with flexible metal conduits and/or armored or metal clad cables, having the characteristic features described above, which is capable of being employed quickly and easily, securely mounting the flexible metal conduit and/or armored or metal clad cable directly with the connector without difficulty.

Another object to the present invention is to provide a connector for use with flexible metal conduits and/or armored or metal clad cables, having the characteristic features described above, which enables the cover or conduit cable holding portion of the connector to be mounted and securely affixed to the base portion of the connector by a single individual employing a single hand.

Another object of the president is to provide a connector for use with flexible metal conduits and/or armored or metal clad cables, having the characteristic features described above, which incorporates a cover or conduit cable holding portion which is pivotally mounted to the base portion for enabling ease-of-use and securement of the components to each other.

Other and more specific objects will in part be obvious and will in part appear hereinafter.

SUMMARY OF THE INVENTION

By employing the present invention, all of the difficulties and drawbacks of the prior art systems have been overcome, and an efficient, easily manufactured and easily assembled conduit/cable connector is realized. Furthermore, using the conduit/cable connector of the present invention, any desired flexible metal conduit and/or armored or metal clad cable is quickly and easily secured to the connector for mounting thereof to an outlet box or junction box at right angles, with complete assurance that the entire mounting operation can be achieved by a single operator both quickly and easily.

In its preferred construction, the conduit/cable connector of the present invention comprises two principal components, a base member and a cover member. The base member is constructed with the desired right angular configuration integrated therein, with fastening means affixed thereto for enabling the base member to be quickly and easily securely mounted to any desired junction box or outlet box.

Typically, the fastening means incorporated as a part of the base member comprises a flange having a diameter greater than the diameter of the pre-formed aperture incorporated into the junction box or outlet box in combination with a threaded end and locknut or an aperture engaging locking device. Regardless of which securement system is employed, the cable/conduit connector of the present invention is quickly and easily affixed to any desired outlet box or junction box.

Once the cable/conduit connector of the present invention is mounted in the desired location to a desired junction box or outlet box, a flexible metal conduit and/or armored or metal clad cable is quickly and easily secured to the cable/conduit connector in order to enable the operator to install the desired electrical wires. Alternatively, the flexible metal conduit and/or armored or metal clad cable is first secured to the conduit/cable connector and, thereafter, the conduit/cable connector, with the flexible metal conduit and/or armored or metal clad cable affixed thereto, are secured to the desired junction box or outlet box.

As discussed above, the prior art conduit/cable connectors require the use of fastening screws in order to secure the cover portion of the connector to the base portion. However, in order to obtain the desired secure mounting of the flexible metal conduit and/or armored or metal clad cable to the connector using this prior art construction, repeated attempts must be made by the user in securing the cover to the base member, dud to the difficulty in obtaining the desired clamping pressure when screws must be secured.

In accordance with the present invention, the conduit/cable connector is constructed with a cover member which is pivotally mounted to the base member and is constructed for being automatically securely affixed to the base member by frictional and locking engagement therewith. In addition, the cover member comprises a pair of gripping fingers constructed for engaging and holding a flexible metal conduit and/or armored or metal clad cable.

As a result of this construction, the operator is able to quickly and easily insert a flexible metal conduit and/or armored or metal clad cable into the gripping fingers of the cover member, and then arcuately pivot the cover member and the engaged metal conduit and/or armored or metal clad cable into the precisely desired mounted position with the base member. In this way, the desired secure mounted engagement and affixation of any desired flexible metal conduit and/or armored or metal clad cable to a conduit/cable connector is achieved with ease and simplicity by a single individual.

In the preferred embodiment of the present invention, the cover member is pivotally mounted to the base member by forming a flange or finger member on the forward, leading edge of the cover member, with the flange or finger member being constructed for lockingly engaging a slot formed on the forward end of the base member. With the flange/finger member of the cover mounted in the slot of the base, the cover member is arcuately pivotable relative to the base, for being easily raised and lowered relative to the base member, while being continuously engaged with the forward, leading edge of the base member.

By employing the present invention, any desired flexible metal conduit and/or armored or metal clad cable is quickly and easily secured to the gripping fingers of the cover member, with the wires contained in the flexible metal conduit and/or armored or metal clad cable being inserted through the associated aperture of the base member of the conduit/cable connector. With the wires extending outwardly from the aperture of the base member, the wires are positioned for being affixed to the interior of the cable box or other housing to which the conduit/cable connector of the present invention is being mounted.

Then, the cover member and the flexible metal conduit and/or armored or metal clad cable are simultaneously pivoted through an arc of about 90°, placing the flexible metal conduit and/or armored or metal clad cable in seated association with the base member, while the cover member is lockingly affixed thereto. In this way, the arcuate movement of the cover member relative to the base member provides the secure mounted engagement of the flexible metal conduit and/or armored our metal clad cable with the conduit/cable connector of the present invention in a rapid and easily achieved manner.

The invention accordingly comprises an article of manufacture possessing the features, properties, and the relation of elements which will be exemplified in the article hereinafter described, and the scope of the invention will be indicated in the claims.

THE DRAWINGS

For a fuller understanding of the nature and objects of the invention, reference should be had to the following detailed description taken in connection with the accompanying drawings, in which:

FIG. 3 is a side elevation view of the conduit/cable connector of the present invention shown with the cover member securely affixed to the base member;

FIG. 4 is a top plan view of a fully assembled conduit/cable connector of the present invention showing the cover member secured to the base member with an armored or metal clad cable mounted therein;

FIG. 5 is a side elevation view of the conduit/cable connector of the present invention showing the cover member disengaged from the base member and incorporating an armored or metal clad cable secured therewith;

FIG. 6 is a top plan view of the cover member of the conduit/cable connector of the present invention;

FIG. 7 is a side elevation view of the cover member of FIG. 6;

FIG. 8 is an end view of the cover member of FIG. 6; and

FIG. 9 is an end view of the base member of the conduit/cable connector of the present invention.

DETAILED DISCLOSURE

Figure 1:
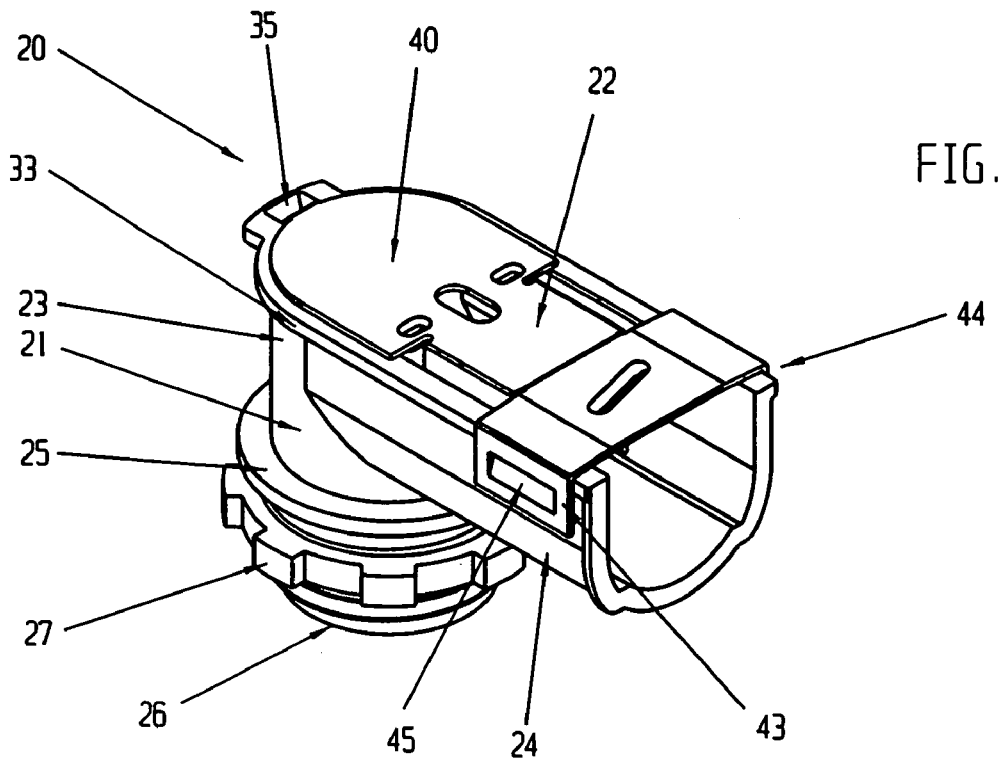
FIG. 1 is a perspective view of the conduit/cable connector of the present invention shown with the one fastening member incorporated therein.

By referring to FIGS. 1–9, along with the following detailed discussion, the construction and use of conduit/cable connector 20 of the present invention can best be understood. In this regard, although two alternate embodiments of the present invention are depicted and detailed herein, further alternate embodiments of the present invention can be implemented without departing from the scope of the present invention. Consequently, it is to be understood that FIGS. 1–9, and the following detailed discussion, are provided for exemplary purposes only and are not intended as a limitation of the present invention.

As shown in FIGS. 1–9, both alternate embodiments of conduit/cable connector 20 incorporate base member 21 and cover portion or member 22. In the preferred construction, base member 21 incorporates substantially cylindrically shaped front section 23 and arcuately curved support section 24 which radially extends from and is interconnected with cylindrically shaped front section 23.

As is evident from the following detailed discussion, by employing this construction of conduit/cable connector 20, base member 21 comprises a generally right angular shaped holding member within which any desired flexible metal conduit and/or armored or metal clad cable is supportingly retained. In this way, the power carrying wires housed in base member 21 are able to extend outwardly from the conduit or cable and curve 90° to emerge from cylindrically shaped front section 23 of base number 21 for being connected within any desired outlet box or junction box.

In addition, in the preferred embodiment, cylindrically shaped front section 23 incorporates radially extending flange 25 formed substantially midway along the length of cylindrically shaped front section 23, and mounting portion 26 extending from flange 25 and forming the terminating, lower end of section 23. Furthermore, as detailed herein, mounting portion 26 may comprise two alternate configurations, depending upon the affixation system that is desired for securely mounting conduit/cable connector 20 to a desired junction box or outlet box.

In the embodiment depicted in FIG. 1, mounting portion 26 comprises a threaded zone extending from the terminating end thereof to flange 25, with locknut 27 threadily engaged therewith. In this way, whenever conduit/cable connector 20 is securely mounted to any desired outlet box or junction box, locknut 27 is removed from the threaded zone of mounting portion 26, while mounting portion 26 is inserted through the aperture formed in the outlet box or junction box to which conduit/cable connector 20 is to be secured. Once connector 20 is mounted in the desired position, locknut 27 is advanced into engagement with the threaded zone of mounting portion 26, thereby securely affixing conduit/cable connector 20 to the desired outlet box or junction box.

Figure 2:
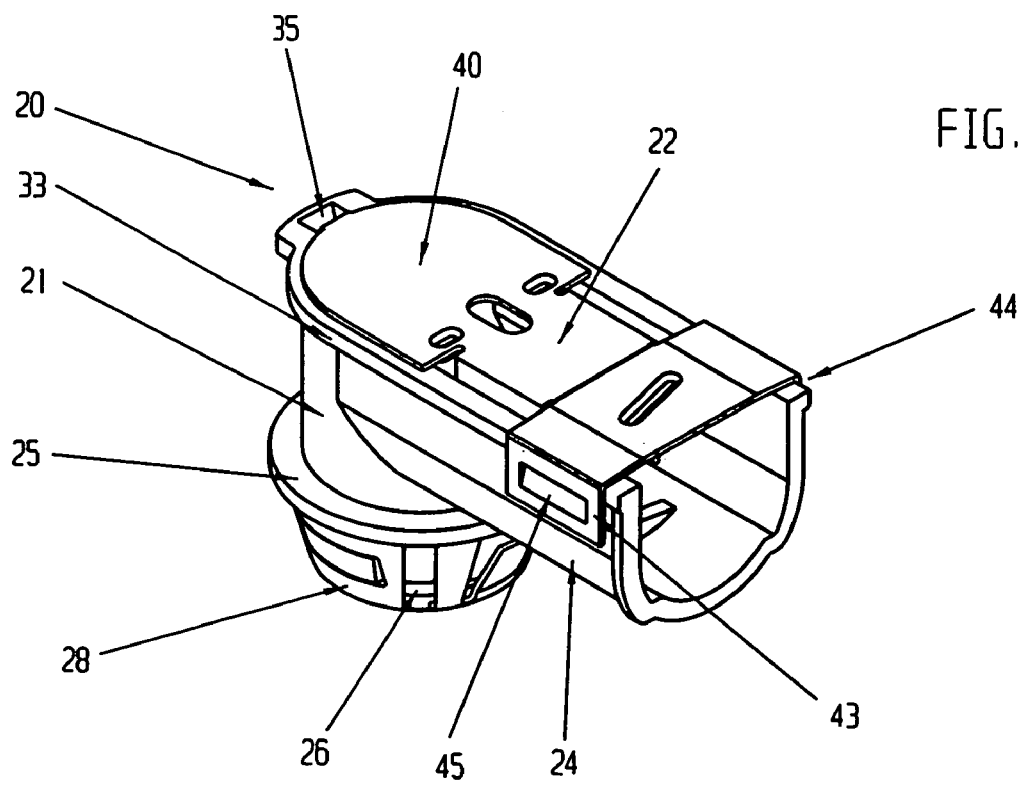
FIG. 2 is a perspective view of the conduit/cable connector of the present invention shown with an alternate fastening member incorporated therein.

In the alternate embodiment, depicted in FIG. 2, mounting portion 26 is constructed for cooperative association and retention of locking collar 28. In this configuration, locking collar 28 is securely retained on mounting portion 26 and is constructed for being telescopically inserted through the aperture formed in the desired outlet box or junction box to which connector 20 is to be mounted. In addition, once locking collar 28 is advanced through the aperture, spring biased holding elements formed therein expand outwardly, securely affixing locking collar 28 and connector 20 into the precisely desired position with the outlet box or junction box.

Regardless of which embodiment of the present invention is employed, the benefits detailed herein regarding conduit/cable connector 20 of the present invention are attained. Furthermore, the detailed construction depicted in FIGS. 3–9, and fully detailed below, regarding base member 21 and cover portion 22 of conduit/cable connector 20 is equally applicable to both embodiments of the present invention shown in FIGS. 1 and 2. Consequently, although FIGS. 3–9 specifically depict the embodiment of FIG. 1, the overall construction and operation of conduit/cable connector 20 of the present invention, as well as the disclosure provided herein, is equally applicable to the embodiment of the present invention depicted in FIG. 2.

In order to best understand the construction and operation ease of conduit/cable connector 20 of the present invention, reference should be made to FIGS. 3–5, wherein conduit/cable connector 20 is depicted in its fully assembled configuration, with two of these views depicting the secure mounted interengagement of armored or metal clad cable 30 therein. In addition, by also referring to FIGS. 6–9, wherein the components of the present invention are shown independently, a full and complete understanding of conduit/cable connector 20 of the present invention can best be made.

As discussed above, base member 21 of conduit/cable connector 20 incorporates cylindrically shaped front section 23 and arcuately curved support section 24, which is integrally connected with front section 23 and extends rearwardly therefrom. In addition, cylindrically shaped front section 23 peripherally surrounds and defines passageway 32 which is constructed for enabling wires 31, extending through armored or metal clad cable 30 and mounted to connector 20, to extended into the outlet box or junction box to which connector 20 is secured.

Furthermore, as best seen in FIG. 9, the arcuately curved shape employed for support section 24 is constructed for enabling armored or metal clad cable 30 to be easily positioned therein, while also peripherally surrounding, securely retaining, and fully supporting cable 30. In addition, base member 21 also comprises longitudinally extending edge 33 which extends outwardly along the outside wall of front section 23 and support section 24.

In order to enable conduit/cable connector 20 of the present invention to be quickly and easily assembled with armored or metal clad cable 30 securely positioned in the precisely desired location, base member 21 also incorporates a flange or finger receiving zone 35 mounted on the forward end of cylindrically shaped front section 23. In its preferred construction, receiving zone 35 comprises aperture 37 which is formed and defined by wall 38 which extends from front section 23 and peripherally surrounds aperture 37.

As is more fully detailed below, finger/flange receiving zone 35 is constructed for receiving and retaining flange/finger member 36, which is formed on the forward end of cover portion/member 22, and is constructed for enabling cover portion/member 22 to be secured to base member 21 and arcuately pivoted relative thereto. By employing this construction, rapid, easily achieved, secure mounted interengagement of any desired armored or metal clad cable 30 with connector 20 is attained.

As best seen in FIGS. 6–8, cover portion/member 22 of conduit/cable connector 20 is constructed in a straightforward, easily manufactured configuration comprising a substantially flat plate 40 which incorporates the depending arm members 41 and 42, and depending side clips 43 and 44. As clearly depicted in the Figures, arm members 41 and 42 extend substantially perpendicularly from plate 40, substantially midway along the overall length of plate 40, and are positioned in juxtaposed, spaced relationship with each other. In addition, arm members 41 and 42 are formed with an overall length, as well as an overall spaced distance therebetween, which is constructed to assure that any desired armored or metal clad cable 30 is quickly and easily inserted between arm members 41 and 42 and securely retained within arm members 41 and 42.

In the preferred construction, side clips 43 and 44 extend substantially perpendicularly from the side of plate 40, positioned adjacent the rear edge thereof. In this way, side clips 43 and 44 are parallel to arm members 41 and 42, while being placed at a spaced distance substantially equivalent to the overall width of arcuately curved support section 24 of base member 21. In this way, side clips 43 and 44 lockingly engage ridge 33 formed on the side edge of arcuately curved support section 24, effectively affixing cover portion/member 22 to base member 21.

In the preferred construction, side clips 43 and 44 each comprise inwardly extending locking tab of 45 formed therein which is constructed and positioned for lockingly engaging ridge 33 formed along the top edge of base member 21. By incorporating this construction, secure affixation of cover portion/member 22 to base member 21 is quickly and easily achieved, while also providing a construction wherein cover portion/member 22 is easily released from its locked engagement with base member 21.

As discussed above, cover portion/member 22 incorporates flange/finger member 36 formed at the forward edge of plate 40. As depicted, flange/finger member 36 is preferably constructed in a J-shaped configuration for being inserted into aperture flange/finger receiving zone 35 of base member 21 and lockingly retained therein. However, although secure retention is achieved, the construction employed also enables cover portion/member 22 to be quickly and easily disconnected from base member 21, whenever desired. As a result, both the assembly and disassembly of the components forming conduit/cable connector 20 of the present invention is easily attained.

In addition to enabling conduit/cable connector 20 to be quickly and easily assembled, the construction employed for flange/finger receiving zone 35 and flange/finger member 36 also enables cover portion/member 22 to be secured to base member 21 while also being arcuately pivotable relative to base member 21. As best seen in FIG. 5, once J-shaped flange/finger member 36 has been mounted within flange/finger receiving zone 35, cover portion/member 22 is secured to base member 21 while also being easily pivoted through an arc of at least 90° relative to base member 21. As a result, cover portion/member 22 can be placed in a position substantially perpendicular to longitudinally extending base member 21 for enabling armored or metal clad cable 30 to be quickly and easily mounted to cover portion/member 22.

As detailed above, cover portion/member 22 incorporates arm members 41 and 42 which extend from plate 40 in cooperating, juxtaposed, spaced relationship to each other. In this regard, arm members 41 and 42 are spaced apart a distance slightly less than the overall diameter of typical armor or metal clad cables 30. As a result, any desired armored or metal clad cable 30 is quickly and easily inserted between arm members 41 and 42 and securely retained by arm members 41 and 42.

In addition, in the preferred assembly process, wires 31 retained within cable 30 are inserted through passageway 32 of base member 21 prior to securing cable 30 between arm members 41 and 42 of cover portion/member 22. In this way, wires 31 are placed in the precisely desired position for enabling wires 31 to be employed for interconnection with the desired components retained within the outlet box or junction box to which conduit/cable connector 20 is mounted or is to be mounted.

Then, once wires 31 of cable 30 are in the desired position extending outwardly from passageway 32 and cable 30 is securely retained by arm members 41 and 42 of cover portion/member 22, cover portion/member 22 is pivoted through an arc of about 90° for effectively placing cable 30 into supporting retention in arcuately curved support section 24 of base member 21. Thereafter, the entire assembly process is completed by assuring that side clips 43 and 44 are lockingly engaged with longitudinally extending ridge 33 of base member 21. Once locking interengagement of clips 43 and 44 with ridge 33 is attained, conduit/cable connector 20 is fully assembled, with cable 30 securely retained in the desired, fully engaged position.

As is evident from the foregoing detailed discussion, the desired secure, mounted engagement of armored or metal clad cable 30 in conduit/cable connector 20 of the present invention is achieved quickly and easily. Furthermore, the placement of wires 31 in conduit/cable connector 20 at right angles to the longitudinally extending axes of cable 30 is easily achieved without requiring the installer or operator to attempt to thread the wires through conduit/cable connector 20 and force the wires to bend about the 90° angle wherein passageway 32 is positioned relative to the longitudinal axis of base member 21.

By employing the construction detailed above, wires 31 of cable 30 are maintained substantially straight, extending in a single longitudinal axis with the axis of cable 30 while the wires are inserted through passageway 32 of base member 21. Only after wires 31 have been fully extended through passageway 32 in this simple, straightforward manner, cable 30 in combination with cover portion/member 22 is arcuately pivoted into secure, locked interengagement with base member 21.

During this arcuate pivoting movement, wires 31 are bent into a 90° angle to enable the wires to extend outwardly from cable 30 and through passageway 32. However, this wire bending process is achieved automatically, without requiring the installer to force wires 31 through a 90° curve. As a result, rapid, simple, easy installation of any armored or metal clad cable 30 is achieved by employing the present invention.

It will thus be seen that the objects sent forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A connector constructed for enabling a flexible metal conduit and/or armored or metal clad cable, having conducting wires extending therein, to be affixed thereto with the connector being secured in an aperture of an outlet box, junction box, or other enclosure, said connector comprising:
   A. a base comprising
      a) a cylindrically shaped section defining a passageway for enabling conducting wires extending through the flexible metal conduit and/or armored or metal clad cable to be passed therethrough,
      b) a conduit/cable receiving and supporting section extending from the cylindrically shaped section at substantially right angles thereto, and constructed for supporting and positioning the flexible metal conduit and/or armored or metal clad cable in the desired position relative to the cylindrically shaped section,
      c) an upstanding wall formed as an integral portion of the cylindrically shaped section peripherally surrounding a major portion of the passageway, and
      d) a locking tab receiving zone formed on the upstanding wall and constructed for cooperating with a tab member; and
   B. a cover comprising an elongated plate construction for cooperating with the base for covering the passageway and for being in overlying engagement with the conduit/cable mounted on the conduit/cable receiving and supporting section, said elongated plate comprising
      a) locking means formed at a first end thereof and constructed for locking interengagement with a portion of the conduit/cable receiving and supporting section,
      b) arm members formed along the length of the cover, extending therefrom, and positioned for partially surrounding the outer surface of the flexible metal conduit and/or armored or metal clad cable and supportingly retaining said conduit/cable, and
      c) a tab member extending from a second end of the cover and constructed for cooperating, locking interengagement with the locking tab receiving zone of the base, whereby said cover is secured to the base, while also being arcuately movable relative thereto.

2. The conduit/cable connector defined in claim 1, wherein the cylindrically shaped section of the base is further defined as being constructed for engagement in the aperture of the junction box, outlet box, or other enclosure.

3. The conduit/cable connector defined in claim 2, wherein the tab receiving zone is further defined as comprising an outwardly extending ledge formed on the upstanding wall at a forward end of the base and incorporating a slot formed therein.

4. The conduit/cable connector defined in claim 3, wherein the tab member is further defined as comprising an outwardly extending flange formed on a forward end of the cover and dimensioned for sliding interengagement in the slot formed in the ledge of the base, whereby said cover is a lockingly engaged in the tab receiving zone of the base.

5. The conduit/cable connector defined in claim 4, wherein the outwardly extending flange forming the tab member is further defined as comprising an L-shape, thereby incorporating a locking portion for securely retaining the cover to the base when the tab member is engaged in the tab receiving zone.

6. The conduit/cable connector defined in claim 1, wherein the arm members extending from the cover are further defined as comprising an arcuately curved shape extending from the elongated plate at substantially right angles to the plate in juxtaposed, spaced, cooperating relationship for peripherally surrounding and securely embracing and holding a portion of the conduit/cable.

7. The conduit/cable connector defined in claim 6, wherein said receiving and supporting section of the base is further defined as comprising a substantially U-shape, dimensioned for receiving and securely holding the conduit/cable therein.

8. The conduit/cable connector defined in claim 7, wherein said conduit/cable receiving and supporting section is further defined as incorporating an outwardly extending ledge formed along a top edge of said U-shaped configuration, with the ledge extending substantially perpendicularly from the surface of the cylindrically shaped section.

9. The conduit/cable connector defined in claim 8, wherein the locking means formed at a first end of the cover are further defined as being constructed for locking engagement with the ledge of the conduit/cable receiving and supporting section.

10. The conduit/cable connector defined in claim 9, wherein said locking means is further defined as comprising two juxtaposed, spaced, cooperating flanges formed at the first end of the plate forming the cover, with said flanges extending substantially perpendicularly from the plate and positioned for cooperating engagement with the ledge of the conduit/cable receiving and supporting section of the base.

11. The conduit/cable connector defined in claim 10, wherein each of the flanges forming said locking means is further defined as comprising a wall portion extending inwardly from the flange and position for providing spring biased, locking engagement with the ledge of the conduit/cable receiving and supporting section.

12. The conduit/cable connector defined in claim 6, wherein said cover is further defined as incorporating a slanted wall portion extending from an interior surface thereof for cooperative engagement with open zones formed between convolutions of the flexible metal conduit and/or armored or metal clad cable.

13. The conduit/cable connector defined in claim 12, wherein said base is further defined as comprising an upstanding wall member formed along an arcuately curved surface of the U-shaped surface and positioned for providing an abutment stop for a leading edge of the conduit/cable.

14. The conduit/cable connector defined in claim 6, wherein said base further comprises a locking device receiving zone formed on a terminating end of the cylindrically shaped section, constructed for cooperating with a locking device for enabling secure mounted engagement of the connector in the aperture of the outlet box, junction box, or other enclosure.

15. The conduit/cable connector defined in claim 6, wherein said base further comprises threads formed on a terminating end of the cylindrically shaped section constructed for cooperating with a lock nut for securing the connector in the aperture of the outlet box, junction box, or other enclosure.

16. A connector constructed for enabling a flexible metal conduit and/or armored or metal clad cable, having conducting wires extending therein, to be affixed thereto with the connector being secured in an aperture of an outlet box, junction box, or other enclosure, said connector comprising:

A. a base comprising
  a) a cylindrically shaped section defining a passageway for enabling conducting wires extending through the flexible metal conduit and/or armored or metal clad cable to be passed therethrough, and constructed for engagement in the aperture of the junction box, outlet box, or other enclosure,
  b) a conduit/cable receiving and supporting section extending from the cylindrically shaped section at substantially right angles thereto, constructed for supporting and positioning the flexible metal conduit and/or armored or metal clad cable in the desired position relative to the cylindrically shaped section, and comprising a substantially U-shape,
  c) an upstanding wall formed as an integral portion of the cylindrically shaped section peripherally surrounding a major portion of the passageway, and
  d) a locking tab receiving zone formed on the upstanding wall and constructed for cooperating with a tab member comprising an outwardly extending ledge formed on the upstanding wall at a forward end of the base and incorporating a slot formed therein; and B. a cover comprising an elongated plate construction for cooperating with the base for covering the passageway and for being in overlying engagement with the conduit/cable mounted on the conduit/cable receiving and supporting section, said elongated plate comprising
  a) locking means formed at a first end thereof and constructed for locking interengagement with a portion of the conduit/cable receiving and supporting section,
  b) arm members formed along the length of the cover, extending therefrom, and positioned for partially surrounding the outer surface of the flexible metal conduit and/or armored or metal clad cable and supportingly retaining said conduit/cable, and
  c) a tab member extending from a second end of the cover and constructed for cooperating, locking interengagement with the locking tab receiving zone of the base, comprising an outwardly extending flange formed on the forward end of the cover and dimensioned for sliding interengagement in the slot formed in the ledge of the base, whereby said cover is secured to the base, while also being arcuately movable relative thereto.

17. The conduit/cable connector defined in claim 16, wherein the outwardly extending flange forming the tab member is further defined as comprising an L-shape, thereby incorporating a locking portion for securely retaining the cover to the base when the tab member is engaged in the tab receiving zone.

18. The conduit/cable connector defined in claim 17, wherein the arm members extending from the cover are further defined as comprising an arcuately curved shape extending from the elongated plate at substantially right angles to the plate in juxtaposed, spaced, cooperating relationship for peripherally surrounding and securely embracing and holding a portion of the conduit/cable.

19. The conduit/cable connector defined in claim 18, wherein said said outwardly extending ledge extends substantially perpendicularly from the surface of the cylindrically shaped section.

20. The conduit/cable connector defined in claim 19, wherein the locking means formed at a first end of the cover are further defined as being constructed for locking engagement with the ledge of the conduit/cable receiving and supporting section, and comprising two juxtaposed, spaced, cooperating flanges formed at a first end of the plate forming the cover, with said flanges extending substantially perpendicularly from the plate and positioned for cooperating engagement with the ledge of the conduit/cable receiving and supporting section of the base.

* * * * *